(12) United States Patent
Herpel et al.

(10) Patent No.: US 8,259,805 B2
(45) Date of Patent: Sep. 4, 2012

(54) METHOD AND APPARATUS FOR GENERATING CODED PICTURE DATA AND FOR DECODING CODED PICTURE DATA

(75) Inventors: Carsten Herpel, Wennigsen (DE); Heinz-Werner Keesen, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1469 days.

(21) Appl. No.: 11/630,020

(22) PCT Filed: May 23, 2005

(86) PCT No.: PCT/EP2005/052343
§ 371 (c)(1),
(2), (4) Date: Jun. 27, 2007

(87) PCT Pub. No.: WO2006/000504
PCT Pub. Date: Jan. 5, 2006

(65) Prior Publication Data
US 2007/0297510 A1 Dec. 27, 2007

(30) Foreign Application Priority Data
Jun. 24, 2004 (EP) .................................... 04090258

(51) Int. Cl.
*H04B 1/66* (2006.01)
*H04N 7/12* (2006.01)
*H04N 11/02* (2006.01)
*G06K 9/36* (2006.01)
*H04N 7/26* (2006.01)
*H04N 7/32* (2006.01)

(52) U.S. Cl. ......... 375/240.15; 375/240.03; 375/240.16; 375/240.26; 382/238

(58) Field of Classification Search ............ 375/240.15, 375/240.03, 240.16, 240.26
See application file for complete search history.

(56) References Cited

U.S. PATENT DOCUMENTS
6,748,020 B1 * 6/2004 Eifrig et al. .............. 375/240.26
(Continued)

FOREIGN PATENT DOCUMENTS
EP 0909092 4/1999
(Continued)

OTHER PUBLICATIONS
Bo-Ruei Chiou, Yun-Chung Shen, Han-Ping Cheng, Ja-Ling Wu; "Performance improvement of distributed video coding by using block mode selection"; Oct. 2010; MM '10: Proceedings of the international conference on Multimedia Publisher: ACM; pp. 1207-1210.*

(Continued)

*Primary Examiner* — Eleni Shiferaw
*Assistant Examiner* — Courtney Fields
(74) *Attorney, Agent, or Firm* — Tutunjian & Bitetto, P.C.

(57) ABSTRACT

Motion compensated temporal prediction is well-known for redundancy reduction in video signal compression. A prediction error signal and a motion vector for a current block are transmitted, describing the location of the predictor block in the reference picture. A problem solved by the invention is to encode and decode video signals using less or no motion vector data side information. This is achieved through a temporal prediction which exploits common knowledge available in both encoder and decoder, requiring that the decoder performs a motion estimation, too. A common baseline motion estimation process is used at both encoder and decoder on the same set of video data that have already been compressed before and, hence, are available at both encoder and decoder, leading to identical motion parameters being generated in the decoder. These common motion parameters are used for generating a default temporal prediction without the need to transmit related motion vectors from the encoder to the decoder.

25 Claims, 3 Drawing Sheets

U.S. PATENT DOCUMENTS

Figure 1:
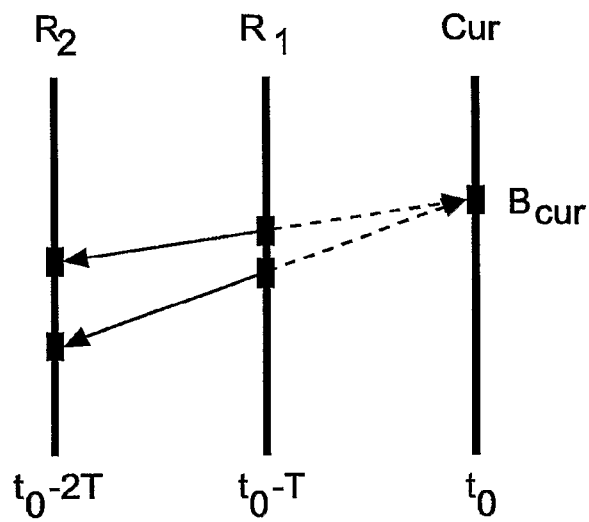

| | | | |
|---|---|---|---|
| 7,177,360 B2 * | 2/2007 | Koto et al. | 375/240.16 |
| 2002/0025077 A1 | 2/2002 | De Haan et al. | |
| 2008/0089410 A1 * | 4/2008 | Lu et al. | 375/240.03 |

FOREIGN PATENT DOCUMENTS

| | | |
|---|---|---|
| EP | 0961499 | 12/1999 |
| JP | 2171092 | 7/1990 |
| JP | 7336695 | 12/1995 |
| JP | 9121355 | 5/1997 |
| JP | 10290463 | 10/1998 |
| JP | 2003259377 | 9/2003 |
| WO | WO 2010086041 A1 * | 8/2010 |

OTHER PUBLICATIONS

"Working Draft No. 2, Revision 2 (WD-2)", Document JVT-B118R2, Jan. 29, 2002, pp. 1-100.

B.G. Haskell et al. "Digital Video: An Introduction to MPEG-2, Chapter 7" Digital Video: An Introduction to MPEG-2, Digital Multimedia Standards Series, Boston, MA., 1997, pp. 146-155.

Search Report Dated August 9, 2005.

* cited by examiner

METHOD AND APPARATUS FOR GENERATING CODED PICTURE DATA AND FOR DECODING CODED PICTURE DATA

This application claims the benefit, under 35 U.S.C. §365 of International Application PCT/EP05/052343, filed May 23, 2005, which was published in accordance with PCT Article 21(2) on Jan. 5, 2006 in English and which claims the benefit of European patent application No. 04090258.7, filed Jun. 24, 2004.

The invention relates to a method and to an apparatus for generating coded picture data and for decoding coded picture data, whereby at decoder side a motion estimation is carried out.

BACKGROUND

Motion compensated temporal prediction is a well-known method for redundancy reduction in video signal compression. A prediction error signal and a motion vector for a current block are transmitted, describing the location of the predictor block or blocks in the reference frame or frames. Hence, part of the saved data rate for coding the source pixels is used for transmitting the motion vector data as side information.

INVENTION

A problem to be solved by the invention is to encode and decode video signals using less or no motion vector data side information. This problem is solved by the methods disclosed in claims 1 and 3. An apparatus that utilises the corresponding method is disclosed in claims 2 and 4, respectively.

According to the invention, improvement of compression quality and/or reduction of transmitted data rate is achieved through a temporal prediction which better exploits common knowledge available in both encoder and decoder.

Motion video usually exhibits objects having a consistent motion throughout a number of consecutive video frames or fields or pictures or images. Known motion compensation makes use of this fact in a very basic way. The encoder performs a computationally costly motion estimation whereas the decoder makes use of the motion computation result data received from the encoder.

The invention, however, exploits the knowledge about consistently moving objects over time in a more sophisticated way, but the invention requires that the decoder performs a motion estimation, too. A common baseline motion estimation process is used at both encoder and decoder on the same set of video data, which leads to identical motion parameters being generated both at encoder and decoder. These common motion parameters are used for generating a 'default' motion compensated prediction without the need to transmit the related motion parameters explicitly from the encoder to the decoder.

The motion estimation is carried out between two or more frames or images that have already been compressed before and, hence, are available at both encoder and decoder. For every block of pixels of a current image a constrained search for matching blocks in the corresponding past reference pictures is performed such that the current pixel block or macroblock lies on the motion trajectory defined by the motion parameters between the matching blocks in the reference pictures. One or more of the best-match blocks in the reference pictures are then taken as the default predictor for said current pixel block.

Advantageously, thereby no transmission of a related motion vector is necessary if the default predictor (according to the default motion compensated prediction) is chosen by the encoder for a given current block or macroblock of pixels. If required due to non-sufficient prediction quality for specific pixel blocks or macroblocks, it is still possible to use encoder prediction only (for calculating a non-default predictor) and the related transmission of motion vector data for the specific pixel blocks or macroblocks. The only additional overhead is data signalling whether the default predictor or a non-default predictor is to be chosen at decoder side.

Instead of signalling this information per block or macroblock, it can also be signalled per picture whereby in such case for all blocks or macroblocks of the picture the inventive motion estimation/prediction and motion based compensation is based on reference pictures not including the current picture.

In principle, the inventive encoding method is suited for generating coded picture data which are encoded using motion estimation and motion compensation, including the steps:

in case of coding a current pixel block or macroblock of a current picture in a temporally predictive mode, calculating according to predetermined rules related motion information using reconstructed picture information from at least two reference pictures which do not include said current picture;

performing said motion compensation using that calculated motion information for said current pixel block or macroblock and corresponding picture information from at least one of said reference pictures;

in said coded picture data, for said current pixel block or macroblock or for said current picture, including motion processing information indicating the corresponding type of coding, but not including motion vector data.

In principle the inventive encoding apparatus is suited for generating coded picture data which are encoded using motion estimation and motion compensation, said apparatus including:

motion estimation means which, in case of coding a current pixel block or macroblock of a current picture in a temporally predictive mode, calculate according to predetermined rules related motion information using reconstructed picture information from at least two reference pictures which do not include said current picture;

motion compensation means applying that calculated motion information for said current pixel block or macroblock, using corresponding picture information from at least one of said reference pictures;

means for including in said coded picture data, for said current pixel block or macroblock or for said current picture, motion processing information indicating the corresponding type of coding, but not including motion vector data.

In principle, the inventive decoding method is suited for decoding coded picture data which were encoded using motion estimation and motion compensation, including the steps:

extracting from said coded picture data, for a current pixel block or macroblock, or for a current picture, which was encoded in a temporally predictive mode, motion processing information indicating whether or not said current pixel block or macroblock, or said current picture, is to be decoded using motion vector data included in said coded picture data, and calculating—in case coded picture data included motion vector data are not to be used—for said current pixel block or macroblock, said current pixel block or macroblock belonging to a current picture, related motion vector information according to predetermined rules using reconstructed picture information from at least two reference pictures which do not include said current picture, wherein said predetermined rules correspond to the predetermined rules which were applied when encoding said current pixel block or macroblock;

performing a motion compensation for said current pixel block or macroblock using said calculated motion vector information and corresponding picture information from at least one of said reference pictures.

In principle the inventive decoding apparatus is suited for decoding coded picture data which were encoded using motion estimation and motion compensation, said apparatus including:

means for extracting from said coded picture data, for a current pixel block or macroblock, or for a current picture, which was encoded in a temporally predictive mode, motion processing information indicating whether or not said current pixel block or macroblock, or said current picture, is to be decoded using motion vector data included in said coded picture data, means for calculating—in case coded picture data included motion vector data are not to be used—for said current pixel block or macroblock, said current pixel block or macroblock belonging to a current picture, related motion vector information according to predetermined rules using reconstructed picture information from at least two reference pictures which do not include said current picture, wherein said predetermined rules correspond to the predetermined rules which were applied when encoding said current pixel block or macroblock;

motion compensation means applying said calculated motion vector information for said current pixel block or macroblock, using corresponding picture information from at least one of said reference pictures.

Advantageous additional embodiments of the invention are disclosed in the respective dependent claims.

DRAWINGS

Figure 2:
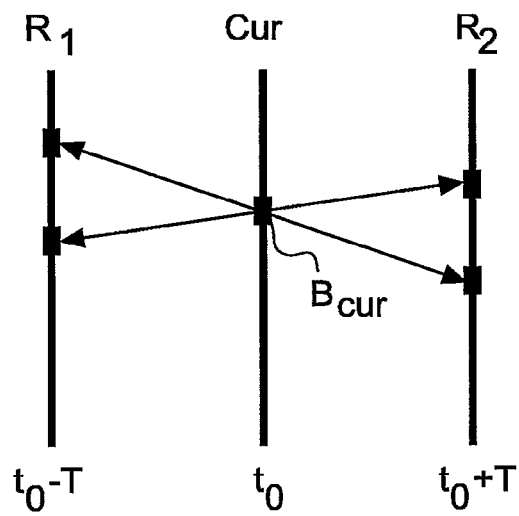
Figure 3:
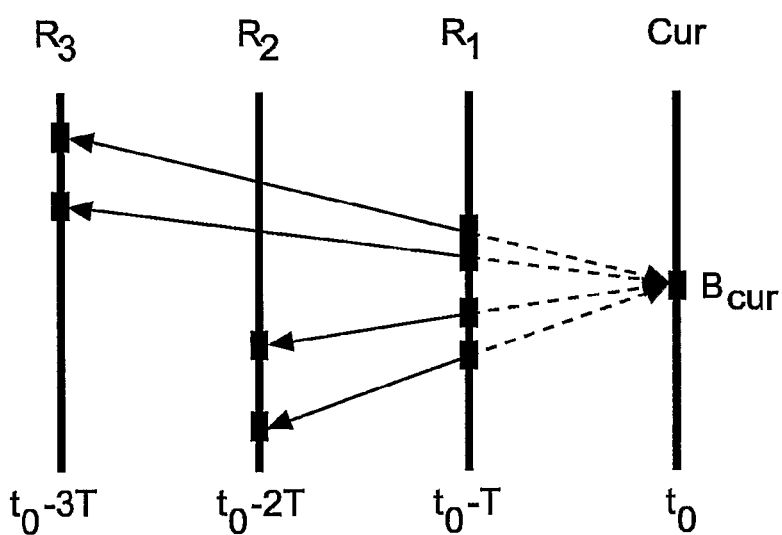
Figure 4:
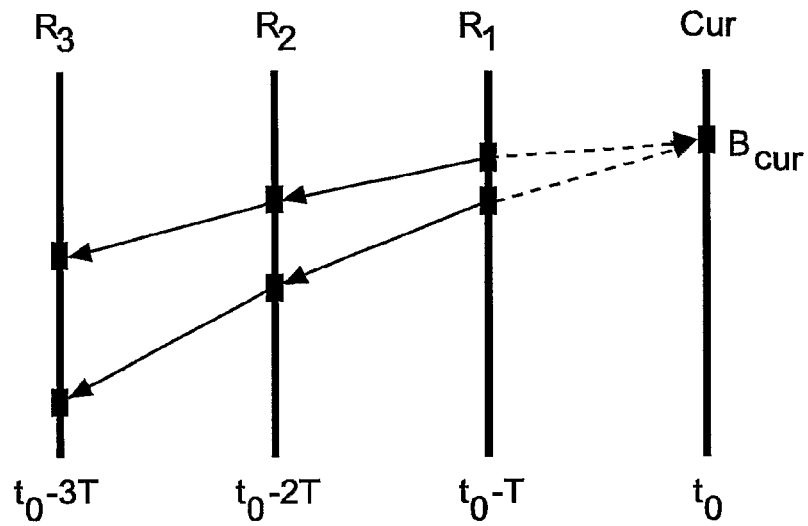
Figure 5:
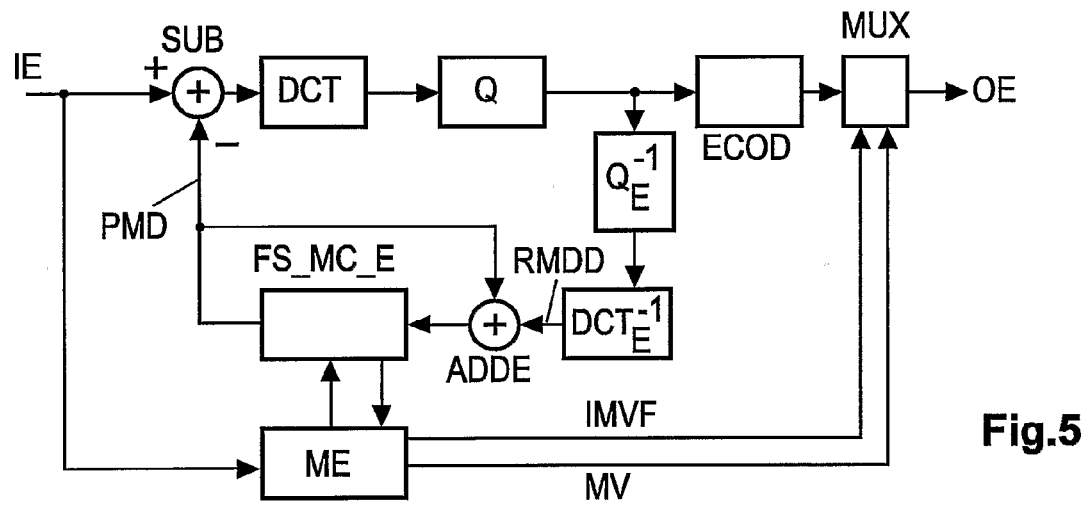
Figure 6:
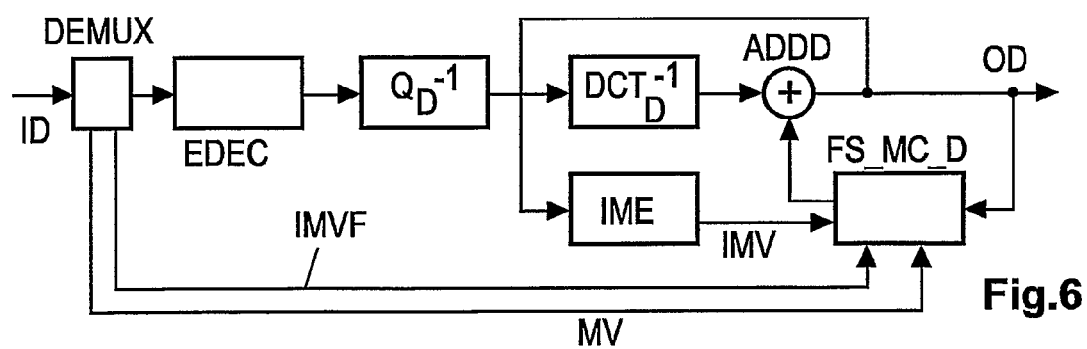
Figure 7:
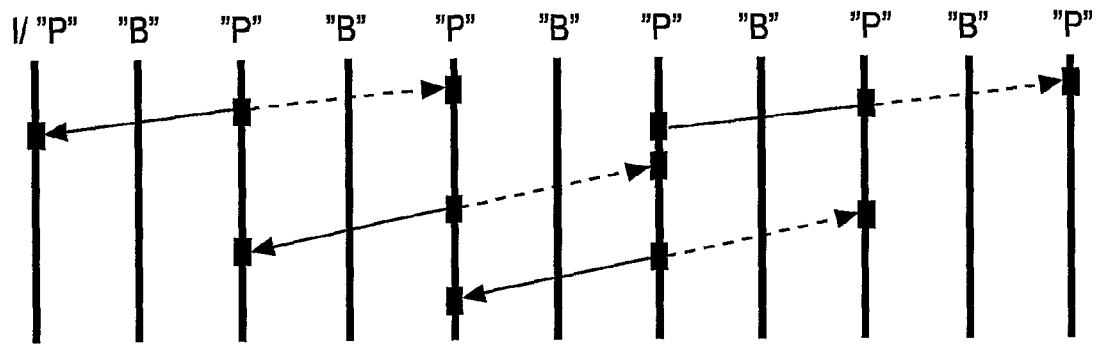
Figure 8:
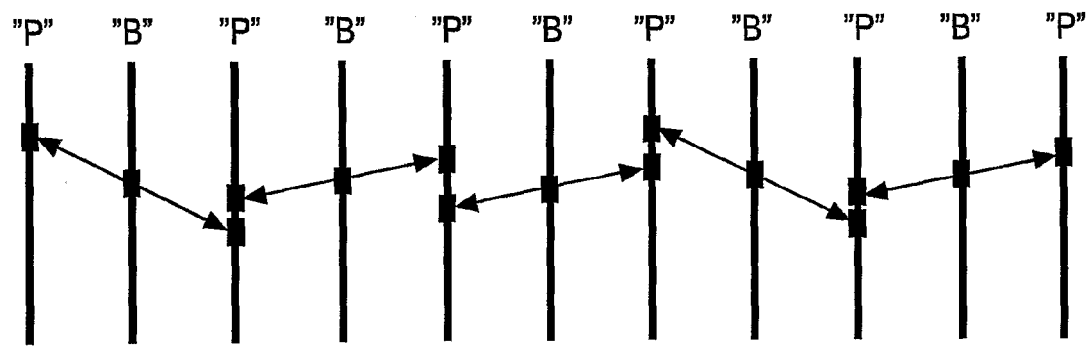

Exemplary embodiments of the invention are described with reference to the accompanying drawings, which show in:

FIG. 1 Linear motion prediction of a current frame using two past reference frames;

FIG. 2 Linear motion prediction of a current frame using one past reference frame and one future reference frame;

FIG. 3 Linear motion prediction of a current frame using more than two past reference frames;

FIG. 4 Non-linear motion prediction of a current frame using three past reference frames;

FIG. 5 Inventive encoder;

FIG. 6 Inventive decoder;

FIG. 7 Sub-sequence of reference pictures of P type;

FIG. 8 Sub-sequence of non-reference pictures of B type.

EXEMPLARY EMBODIMENTS

The baseline motion estimation process is executed in the encoder and in the decoder in a way that guarantees the same result on both sides. Assuming that this baseline motion estimation process consists of block matching, this requires definition of the same cost function (e.g. the sum of absolute frame pixel differences), of the resolution of the motion search (e.g. ±½ pixel accuracy), of the search range ±RNG (e.g. RNG=64 pixels) and of the search strategy (e.g. a full search or a specific, precisely defined hierarchical search).

The baseline motion estimation process is constrained such that the same motion assumption (and calculation) between the reference frames and the current frame Cur is shared by encoder and decoder. For example, in case of using a linear motion assumption and two reference frames $R_1$ and $R_2$ this means for each current block $B_{cur}(X,Y)$ in a current frame Cur that the searched blocks $B_{r1}$ and $B_{r2}$ in the reference frames $R_1$ and $R_2$ are connected by a rule or formula that represents the temporal relation between the two reference frames and the current frame.

EXAMPLE 1

The current frame is located at $t=t_0$. There are two reference frames $R_1$ and $R_2$, both are located in the past at $t=t_0-T$ and $t=t_0-2T$, respectively, whereby T is the frame period. In that case, motion vectors $(v_x, v_y)$ are estimated for $B_{cur}(X,Y)$ using the blocks $B_{r1}(X-v_x, Y-v_y)$ and $B_{r2}(X-2v_x, Y-2v_y)$ as illustrated in FIG. 1 for a one-dimensional case, with $v_x$, $v_y$ lying in the range [−RNG . . . RNG].

EXAMPLE 2

The current frame is located at $t=t_0$. There are two reference frames $R_1$ and $R_2$, one located in the past at $t=t_0-T$ and one in the future at $t=t_0+T$, respectively. In that case, motion vectors $(v_x, v_y)$ are estimated for $B_{cur}(X,Y)$ using the blocks $B_{r1}(X-v_x, Y-v_y)$ and $B_{r2}(X+v_x, Y+v_y)$ as illustrated in FIG. 2 for a one-dimensional case, with $v_x$, $v_y$ lying in the range [−RNG . . . RNG].

Multiple Best Matches

The baseline motion estimation process for a given block may yield multiple candidate motion vectors with the same lowest cost function value. In that case an additional criterion for selecting the best match is needed. The choice which additional criteria to use depends on the kind of coding applied for non-default motion predictors that do require transmission of motion vector data in order to optimise motion vector data compression efficiency.

For example, if motion vector prediction is used, the match with the motion vector most similar to the motion vector predictor is chosen. Otherwise, the match (or block) located closest to the original block (i.e. the smallest absolute value of the motion vector) is chosen.

Selection of Default Predictor Block

For an identified best-match motion vector both of the two blocks in the two reference frames are predictor candidates for current block $B_{cur}$ in the current frame Cur. The actual predictor of current block $B_{cur}$ can be for example one of these two best-matching blocks or the pixel-wise average of these two blocks, or any other weighted combination of these two blocks. If the two reference frames have different temporal distance to the current frame, it is advantageous to select the best-matching block from the reference frame that is located closer to the current frame Cur. If the two reference frames have the same temporal distance to the current frame (as in Example 2 above) it is advantageous to select the pixel-wise average of the two best-matching blocks as the best-matching block.

Multiple Reference Frames

The baseline motion estimation process can be extended to search into more than two reference frames. In that case, as an example, each set or pair of two reference frames and the current frame Cur are subjected to the constrained prediction described above. A search between frames $R_1$ and $R_2$ as well as between frames $R_1$ and $R_3$ is illustrated in FIG. 3. The default predictor is selected from the best-match blocks in either of these reference frame pairs, applying the rules about multiple best matches and selection of default predictor block as described above.

Higher Order Motion Model Assumption

If more than two reference frames are used, rather than using multiple pairs of frames for matching as in the paragraph above, a higher order motion model assumption can be shared between encoder and decoder, for example searching best-match blocks under the assumption of linear acceleration or deceleration, i.e. non-linear motion.

As an example, equidistant reference frames $R_1$, $R_2$ and $R_3$ located at $t_0-T$, $t_0-2T$ and $t_0-3T$, respectively, and a motion equation of type $s=v_0 t+at^2$, with 's' being the distance traversed, '$v_0$' being the initial velocity and 'a' being the acceleration. The motion parameters to be determined now consist of a motion vector $(v_x, v_y)$ and an acceleration parameter $(a_x, a_y)$. Considering the quadratic dependency on the acceleration, the necessary constraints between the respective blocks $B_{r1}$, $B_{r2}$ and $B_{r3}$ of the reference frames $R_1$, $R_2$ and $R_3$ that are searched for a given block $B_{cur}$ of the current frame Cur become apparent. For current block $B_{cur}(X,Y)$ the blocks $B_{r1}(X-v_x-a_x, Y-v_y-a_y)$,
$B_{r2}(X-2v_x-2a_x, Y-2v_y-2a_y)$ and
$B_{r3}(X-3v_x-4a_x, Y-3v_y-4a_y)$ are to be compared.

$v_x$, $v_y$, $a_x$ and $a_y$ can vary within a maximum motion search range, for example $3v_x+4a_x$ lying in the range [−RNG . . . RNG] and $3v_y+4a_y$ lying in the range [−RNG . . . RNG]. FIG. 4 depicts a corresponding prediction in the one-dimensional case.

The best set of motion parameters $(v_x, v_y)$ and $(a_x, a_y)$ is determined by using an additive cost function summing up the sum of absolute differences between $B_{r1}$ and $B_{r2}$ and adding this to the sum of absolute differences between $B_{r2}$ and $B_{r3}$. After finding the set of best-match blocks and the associated motion parameters, the default predictor block in this case is the best-match block from the closest reference frame $R_1$.

Motion estimation with higher order motion assumption can also be carried out using non-equidistant reference frames or reference frames that lie partly in the past and partly in the future of the current frame, with adequate modification of the constrained search block taking into account the different temporal distances.

The invention is not constrained to motion estimation algorithms classically associated to video coding, such as block matching, but can advantageously also be combined with temporally recursive motion estimation algorithms that are known to reconstruct the true motion (or the 'optical flow') much better than block matching. Recursive motion estimation algorithms can generate per-pixel motion information which is (due to maximum data rate constraints) prohibitive to transmit in a compression scheme.

However, when using the invention a transmission of such motion information is not necessary, and therefore the invention can also be used for temporal prediction using pixel motion vector resolution.

In FIG. 5 the video data input signal IE of the encoder contains e.g. 16*16 macroblock data including luminance and chrominance pixel blocks for encoding. In case of video data to be intraframe or intrafield coded (I mode) they pass a subtractor SUB unmodified. Thereafter the e.g. 8*8 pixel blocks of the 16*16 macroblocks are processed in discrete cosine transform means DCT and in quantising means Q, and are fed via an entropy encoder ECOD to a multiplexer MUX which outputs the encoder video data output signal OE. Entropy encoder ECOD can carry out Huffman coding for the quantised DCT coefficients. In the multiplexer MUX header information and motion vector data MV and possibly encoded audio data are combined with the encoded video data.

In case of video data to be interframe or interfield coded (P or B mode, P means 'predicted' and B means 'bi-directionally predicted'), predicted macroblock data PMD are subtracted on a block basis from the input signal IE in subtractor SUB, and 8*8 block difference data are fed via transform means DCT and quantising means Q to the entropy encoder ECOD. The output signal of quantising means Q is also processed in corresponding inverse quantising means $Q_E^{-1}$, the output signal of which is fed via corresponding inverse discrete cosine transform means $DCT_E^{-1}$ to the combiner ADDE in the form of reconstructed block or macroblock difference data RMDD. The output signal of ADDE is buffer-stored in a picture store in motion compensation means FS_MC_E, which carry out motion compensation for reconstructed macroblock data and output correspondingly predicted macroblock data PMD to the subtracting input of SUB and to the other input of the combiner ADDE. The characteristics of the quantising means Q and the inverse quantising means $Q_E^{-1}$ are controlled e.g. by the occupancy level of an encoder buffer in entropy encoder ECOD.

A motion estimator ME receives the input signal IE and provides motion compensation means FS_MC_E with the necessary motion information and provides multiplexer MUX with motion vector data MV for transmission to, and evaluation in, a corresponding decoder. $Q_E^{-1}$, $DCT_E^{-1}$, ADDE and FS_MC_E constitute a simulation of the receiver-end decoder, which is described in connection with FIG. 6.

Motion estimator ME calculates motion information including motion vectors in two basically different modes of which the first one is described above. The second mode is related to the invention. In this second mode, ME does not use picture data from the input signal IE but instead uses data from reconstructed pictures (frames or fields) provided by motion compensation means FS_MC_E. FS_MC_E and ME include memories for storing the above-mentioned required reference pictures $R_1$ and $R_2$, or $R_1$, $R_2$ and $R_3$. In the second mode, too, ME provides motion compensator FS_MC_E with motion vector data, but does not transfer the motion vector data MV to multiplexer MUX. Instead, it signals via an internal motion vector flag IMVF to multiplexer MUX (and thereby to the receiver-side decoders) that the internally calculated motion vector data IMV (see FIG. 6) are to be used in the motion compensation at receiver side. The internal motion vector flag IMVF can be a separate flag, or it can be hidden in a special code word for motion vector data or motion information data.

In FIG. 6 the encoded video data input signal ID is fed via a demultiplexer DEMUX, entropy decoder means EDEC, inverse quantising means $Q_D^{-1}$ and inverse discrete cosine transform means $DCT_D^{-1}$ to a combiner ADDD, which outputs the video data output signal OD. EDEC can carry out e.g. Huffman decoding for the Huffman encoded and quantised coefficients. Demultiplexer DEMUX correspondingly separates bitstream header information, encoded video data, video data type data (I, P, B), and motion information data like internal motion vector flag data IMVF and motion vector data MV.

$Q_D^{-1}$ and $DCT_D^{-1}$ and EDEC have a function which is the corresponding inverse of the functions of Q, DCT and ECOD in the encoder of FIG. 5, related to the corresponding macroblock and pixel block sizes. The output signal of ADDD is intermediately stored in a picture data buffer in motion compensation means FS_MC_D, FS_MC_D effecting a motion compensation for reconstructed macroblock data according to the transmitted motion vector data MV or the internally generated motion vector data IMV, and outputting in case of a P or B mode correspondingly predicted block or macroblock data PMD to the other input of adder ADDD in which the predicted data are combined on a block basis with the received block difference data. In case of I mode no predicted picture data are applied to the second input of adder ADDD.

The status of IMVF determines whether the motion compensation means FS_MC_D use the transmitted and received motion vector data MV or the motion vector data IMV internally generated in internal motion estimator IME. FS_MC_D and IME include memories for storing the above-mentioned required reference pictures $R_1$ and $R_2$, or $R_1$, $R_2$ and $R_3$. As explained above, ME in the encoder and IME in the decoder are estimating motion in the picture content (i.e. motion for the picture content of blocks or macroblocks) based on the same reference picture data, using the same motion estimation processing, and thus leading to the same content of their motion information output data.

Instead of means DCT, Q, $Q_E^{-1}$, $DCT_E^{-1}$ and ECOD in the encoder and instead of means DCOD, $Q_E^{-1}$ and $DCT_E^{-1}$ in the decoder, any other type of coding/decoding loop can be used which includes motion prediction and compensation.

The invention can also be used for coding, transmitting or decoding a sequence of pictures in a way as is illustrated in connection with FIG. 7 and FIG. 8, in which sequence in an alternating manner a current picture is either available or not available as a reference picture for subsequent pictures. In FIG. 7, starting from an I or P picture, every second picture in the picture sequence is a picture of quasi-P type, i.e. a reference picture which is used in the encoder and in the decoder as a basis for temporal prediction or motion estimation, thereby forming a sub-sequence of reference pictures. In FIG. 8 every second picture in the picture sequence is a non-reference picture of quasi-B type each being arranged between two quasi-P pictures, i.e. a picture which is not used in the encoder and in the decoder as a reference for temporal prediction or motion estimation. The quasi-B pictures are predicted from two or more corresponding reference pictures, preferably from the two adjacent reference pictures. As an alternative, two or more quasi-B pictures can be located between each quasi-P picture.

Advantageously, the invention can be used to implement the known MPEG GOP (group of pictures) structure: the quasi-P pictures are generated using a reference picture based encoder/decoder prediction. The quasi-B pictures can thereafter be generated using motion vector fields which can be finer or improved with respect to those of the known MPEG B picture construction.

It is an advantage of the invention that the overhead for motion information remains very low no matter how complex the motion within a scene is.

In case of temporarily scarce bandwidth, a coded image could even be conveyed with just one bit indicating "use default predictor for every block", yielding much better results than the currently state-of-the-art "repeat the last picture", since at least a good trace of the motion within the scene remains even though details will start to be erroneous.

Motion information (motion vectors, type of prediction, etc.) typically amounts to 10-20% of coded data with state-of-the-art video codecs. Depending on the quality of the chosen baseline motion estimation process, most of this data rate can be saved and used for improved transmission of prediction error signals instead.

The invention claimed is:

1. A method for generating coded picture data which are encoded using motion estimation and motion compensation, said method comprising the steps:

in case of coding a current pixel block or macroblock of a current picture in a temporally predictive mode, estimating according to predetermined rules related motion information using reconstructed picture information from at least two reference pictures which do not include said current picture and which are temporally prior to said current picture;

performing said motion compensation using that estimated motion information for said current pixel block or macroblock and corresponding picture information from at least one of said reference pictures, whereby, in said coded picture data, for said current pixel block or macroblock or for said current picture, motion processing information is included that indicates the corresponding type of coding, and whereby, if for decoding in a decoder-located motion estimation according to said predetermined rules is to be performed using reconstructed picture information from said at least two reference pictures, no motion vector data but motion vector flag data, signaling that for said current pixel block or macroblock or for said current picture said decoder-located motion estimation is to be carried out, are included in said coded picture data.

2. The method according to claim 1, wherein two reference pictures are used which both are located temporally before said current picture.

3. The method according to claim 1 wherein, if, related to the motion vector for said current pixel block or macroblock, two best-matching blocks with the same lowest cost function value are found in said reference pictures and the related reference pictures have a different temporal distance to said current picture, that one of the best-matching blocks is selected for predicting said current pixel block or macroblock of which the related reference picture is located temporally closer to said current picture, or if the related reference pictures have the same temporal distance to said current picture, a pixel-wise average of the two best-matching blocks is used for predicting said current pixel block or macroblock.

4. The method according to claim 1, wherein more than two reference pictures are used for estimating motion vector information and the motion vector related to said current pixel block or macroblock is searched into different pairs of these reference pictures.

5. The method according to claim 4, wherein said more than two reference pictures are used for estimating motion vector information including non-linear type of motion.

6. The method according to claim 1, wherein said motion estimation is a recursive motion estimation providing motion vector information per pixel.

7. A method for decoding coded picture data, which were encoded using motion estimation and motion compensation, wherein in case a current pixel block or macroblock of a current picture was coded in a temporally predictive mode, related motion information was estimated according to predetermined rules using reconstructed picture information from at least two reference pictures which do not include said current picture and which are temporally prior to said current picture, and wherein in said coded picture data, for said current pixel block or macroblock or for said current picture, motion processing information indicating the corresponding type of coding was included, whereby, if for decoding of said coded picture data a decoder-located motion estimation according to said predetermined rules is to be performed, no motion vector data but motion vector flag data, signaling that for said current pixel block or macroblock or for said current picture said decoder-located motion estimation is to be carried out, were included in said coded picture data, said decoding method comprising the steps:

extracting from said coded picture data, for a current pixel block or macroblock, or for a current picture, which was encoded in a temporally predictive mode, said motion vector flag data;

estimating—in case said motion vector flag data signal that for said current pixel block or macroblock or for said current picture said decoder-located motion estimation is to be carried out—for said current pixel block or macroblock related motion vector information according to said predetermined rules using reconstructed picture information from said at least two reference pictures which do not include said current picture;

performing a motion compensation for said current pixel block or macroblock using said estimated motion vector information and corresponding picture information from at least one of said reference pictures.

8. Method according to claim 7, wherein two reference pictures are used which both are located temporally before said current picture.

9. The method according to claim 7 wherein, if, related to the motion vector for said current pixel block or macroblock, two best-matching blocks with the same lowest cost function value are found in said reference pictures and the related reference pictures have a different temporal distance to said current picture, that one of the best-matching blocks is selected for predicting said current pixel block or macroblock of which the related reference picture is located temporally closer to said current picture, or if the related reference pictures have the same temporal distance to said current picture, a pixel-wise average of the two best-matching blocks is used for predicting said current pixel block or macroblock.

10. The method according to claim 7, wherein more than two reference pictures are used for estimating motion vector information and the motion vector related to said current pixel block or macroblock is searched into different pairs of these reference pictures.

11. The method according to claim 10, wherein said more than two reference pictures are used for estimating motion vector information including non-linear type of motion.

12. The method according to claim 7, wherein said motion estimation is a recursive motion estimation providing motion vector information per pixel.

13. An apparatus for generating coded picture data which are encoded using motion estimation and motion compensation, said apparatus comprising: motion estimation means which, in case of coding a current pixel block or macroblock of a current picture in a temporally predictive mode, estimate according to predetermined rules related motion information using reconstructed picture information from at least two reference pictures which do not include said current picture and which are temporally prior to said current picture;

motion compensation means applying that estimated motion information for said current pixel block or macroblock, using corresponding picture information from at least one of said reference pictures;

means being adapted for including in said coded picture data, for said current pixel block or macroblock or for said current picture, motion processing information indicating the corresponding type of coding, whereby, if for decoding in a decoder a decoder-located motion estimation according to said predetermined rules is to be performed using reconstructed picture information from said at least two reference pictures, no motion vector data but motion vector flag data, signaling that for said current pixel block or macroblock or for said current picture said decoder-located motion estimation is to be carried out, are included in said coded picture data.

14. The apparatus according to claim 13, wherein two reference pictures are used which both are located temporally before said current picture.

15. The apparatus according to claim 13 wherein, if, related to the motion vector for said current pixel block or macroblock, two best-matching blocks with the same lowest cost function value are found in said reference pictures and the related reference pictures have a different temporal distance to said current picture, that one of the best-matching blocks is selected for predicting said current pixel block or macroblock of which the related reference picture is located temporally closer to said current picture, or if the related reference pictures have the same temporal distance to said current picture, a pixel-wise average of the two best-matching blocks is used for predicting said current pixel block or macroblock.

16. The apparatus according to claim 13, wherein more than two reference pictures are used for estimating motion vector information and the motion vector related to said current pixel block or macroblock is searched into different pairs of these reference pictures.

17. The apparatus according to claim 16, wherein said more than two reference pictures are used for estimating motion vector information including non-linear type of motion.

18. The apparatus according to claim 13, wherein said motion estimation is a recursive motion estimation providing motion vector information per pixel.

19. An apparatus for decoding coded picture data which were encoded using motion estimation and motion compensation, wherein in case a current pixel block or macroblock of a current picture was coded in a temporally predictive mode, related motion information was estimated according to predetermined rules using reconstructed picture information from at least two reference pictures which do not include said current picture and which are temporally prior to said current picture, and wherein in said coded picture data, for said current pixel block or macroblock or for said current picture, motion processing information indicating the corresponding type of coding was included, whereby, if for decoding of said coded picture data a decoder-located motion estimation according to said predetermined rules is to be performed, no motion vector data but motion vector flag data, signaling that for said current pixel block or macroblock or for said current picture said decoder-located motion estimation is to be carried out, were included in said coded picture data, said apparatus comprising:

means for extracting from said coded picture data, for a current pixel block or macroblock, or for a current picture, which was encoded in a temporally predictive mode, said motion vector flag data;

means for estimating—in case said motion vector flag data signal that for said current pixel block or macroblock or for said current picture said decoder-located motion estimation is to be carried out—for said current pixel block or macroblock, said current pixel block or macroblock related motion vector information according to said predetermined rules using reconstructed picture information from at least two reference pictures which do not include said current picture;

motion compensation means applying said estimated motion vector information for said current pixel block or macroblock, using corresponding picture information from at least one of said reference pictures.

20. The apparatus according to claim 19, wherein two reference pictures are used which both are located temporally before said current picture.

21. The apparatus according to claim 19 wherein, if, related to the motion vector for said current pixel block or macroblock, two best-matching blocks with the same lowest cost function value are found in said reference pictures and the related reference pictures have a different temporal distance to said current picture, that one of the best-matching blocks is selected for predicting said current pixel block or macroblock of which the related reference picture is located temporally closer to said current picture, or if the related reference pictures have the same temporal distance to said current picture, a pixel-wise average of the two best-matching blocks is used for predicting said current pixel block or macroblock.

22. The apparatus according to claim 19, wherein more than two reference pictures are used for estimating motion vector information and the motion vector related to said current pixel block or macroblock is searched into different pairs of these reference pictures.

23. The apparatus according to claim 22, wherein said more than two reference pictures are used for estimating motion vector information including non-linear type of motion.

24. The apparatus according to claim 19, wherein said motion estimation is a recursive motion estimation providing motion vector information per pixel.

25. A non-transitory storage medium on which a bitstream is recorded or stored that includes coded picture data which have been encoded using the method according to claim 1.

* * * * *